United States Patent [19]

Hrovat et al.

[11] Patent Number: 4,606,874

[45] Date of Patent: Aug. 19, 1986

[54] PROCESS FOR THE PRODUCTION OF HIGH TEMPERATURE RESISTANT, HIGH DENSITY CERAMIC MOLDED ARTICLES

[75] Inventors: Milan Hrovat, Rodenbach; Hans Huschka, Hanau; Heinrich Porth, Hanau; Lothar Rachor, Hanau; Thomas Schmidt-Hansberg, Frankfurt, all of Fed. Rep. of Germany

[73] Assignee: Nukem GmbH, Hanau, Fed. Rep. of Germany

[21] Appl. No.: 688,192

[22] Filed: Jan. 2, 1985

[30] Foreign Application Priority Data

Jan. 28, 1984 [DE] Fed. Rep. of Germany ....... 3402979

[51] Int. Cl.$^4$ ............................................. C04B 33/32
[52] U.S. Cl. ..................................... 264/56; 264/322; 264/325; 264/DIG. 65
[58] Field of Search ................. 264/DIG. 65, 56, 322, 264/325

[56] References Cited

U.S. PATENT DOCUMENTS 2,089,030 8/1937 Kratky .................................. 264/56
2,386,604 10/1945 Goetzel ................................. 264/56
2,694,245 11/1954 Rogers et al. ......................... 264/56

FOREIGN PATENT DOCUMENTS 50-54609 5/1975 Japan ................................... 264/325

OTHER PUBLICATIONS

Am. Ceram. Soc. Bull., 54 (1975) vol. 2, pp. 201–205.

*Primary Examiner*—James Derrington
*Attorney, Agent, or Firm*—Cushman, Darby & Cushman

[57] ABSTRACT

There is described a process for the production of high temperature resistant, high density ceramic molded articles at a temperature above 1300° C. and at high pressure in a mold. For this purpose, the blank is heated outside the mold, transferred with a die at 1 to 10 m/sec into the cold mold, compressed there and ejected in the pressing direction. Thereby, the residence time in the mold must be less than 3 msec and the sum of the transport time of the blank from heating up to the mold and the residence time in the mold so regulated that the temperature drop between the nucleus of the blank and the surface of the blank does not exceed 150° C.

7 Claims, No Drawings

PROCESS FOR THE PRODUCTION OF HIGH TEMPERATURE RESISTANT, HIGH DENSITY CERAMIC MOLDED ARTICLES

BACKGROUND OF THE INVENTION

The invention is directed to a process for the production of high temperature resistant, high density ceramic molded articles made of one or more components by the action of force on blanks at a temperature above 1300° C. and at high pressure in a mold.

High temperature resistant ceramic molded articles are distinguished by a number of advantages; especially thereby the mechanical behavior above 1200° C. plays an important role. As work materials, there are employed, for example, high temperature resistant oxides, carbides, nitrides, silicides borides, and mixtures of these materials.

The processes previously tired on an industrial scale for the production of such molded articles chiefly depend on molding of powders or mixtures of powders and subsequently sintering the blanks (molding-sintering-process). Furthermore, there are known processes for working up untreated or presintered ceramic molded articles by hot isostatic presses (HIP) (e.g., Am. Ceram. Soc. Bull. 54 (1975), Vol. 2, pages 201-205).

Since, because of the materials employed, the operating temperature both in the sintering and in the hot pressing are limited to below 2000° C. the necessary high pressures, especially with high melting ceramics, are customarily obtained only by the addition of sintering adjuvants.

However, in a disadvantageous manner these can impart undesired creep properties with the high temperature behavior. A substantial disadvantage also is in the duration of the sintering process (several hours).

With hot isostatic presses, additionally the heat and pressure act simultaneously on the blank and the mold over a long time. This requires extremely expensive constructions, especially for thermal insulation of the hot construction components. The molding cycle as such likewise lasts for a long time and is customarily in the range of hours.

Therefore, it was the problem of the present invention to develop a process for the production of high temperature resistant, high density ceramic molded articles out of one or more components by the action of force on blanks at temperatures above 1300° C. and high pressure in a mold, which process is carried out very rapidly without excessive demands on the mold and without the use of sintering adjuvants.

SUMMARY OF THE INVENTION

This problem was solved according to the invention by heating the blank outside the mold to the required molding temperature and subsequently conveying the blank with a quick, movable pressing die with a velocity of 1 to 10 m/sec into the cold mold closed by a lower die on the opposite side, compressing there and ejecting in the pressing direction, whereby the sum of the time of conveying the blank from the heating oven to the mold and the residence time in the mold is so regulated that the drop in the temperature of the blank arising between the nucleus of the blank and the surface of the blank does not exceed 150° C. and the residence time in the mold is less than 3 msec (milliseconds).

It has proven advantageous if the heated blank is cooled during the transportation and pressing process at most 100° C. on the blank surface which presupposes a quick transport of the blank between the heating oven and the mold. This transportation is preferably carried out by means of a falling-zone which ends before the mold opening.

It has also proven advantageous to leave the molding temperature below the melting point of the lowest melting components of the molded article if the molded article contains several materials. Preferably, the molding temperature is about 100° C. below the melting point of the lowest melting components.

The most substantial advantage of the process of the invention is that in contrast to other hot molding methods because of the high pressing speeds heat and pressure are decoupled to the maximum extent and, therefore, act simultaneously on the blank only over a very short time span (<3 msec). Through this, all interactions between blank and work tool are avoided, since these require a certain amount of time, and the molds are not subjected to excessive demands. Besides, there are not needed any sintering adjuvants.

A further advantage of the process of the invention is that the blank can be heated very quickly outside the mold, especially in the temperature range (>1200° C.) which is sensitive because of vaporization, which might occur or the beginning of decompositions, at which temperature range the high melting ceramic no longer shows brittleness. In this range, for work materials such as zirconium dioxide ($ZrO_2$), aluminum oxide/titanium carbide ($Al_2O_3$/TiC), as well as silicon carbide (SiC), heating speeds up to 100° C. per second can be realized Consequently, in the process of the invention in comparison to the previously known molding process, heating and molding can be an order of magnitude quickly. The high heating and molding speeds in turn represent the basis for short time cycles, from which there results a clearly lower expense for construction and the lowest possible production costs.

Unless otherwise indicated, all parts and percentages are by weight.

The process can comprise, consist essentially of, or consist of the stated steps with the recited materials.

The following examples explain the process of the invention in more detail.

DETAILED DESCRIPTION

Example 1

There were employed as starting material for the production of a zirconium dioxide cylinder (diameter=20 mm, H=60 mm) a zirconium dioxide powder having a particle size of 2-3 $\mu$m, a BET surface area of $\approx$15 m$^2$/g, and a bulk density of 1.05 g/cm$^3$. There was preliminarily cold pressed from this $ZrO_2$ powder with a molding pressure of 200 MN/m$^2$ a cylinder having the dimension diameter=23 mm, H=85 mm. The density of the green blank was 3.2 g/cm$^3$—corresponding to 51 percent of the theoretical.

The preliminarily pressed molded article was heated in an oven under an inert gas atmosphere to 2300° C. whereby the diameter of the blank was reduced to 20.4 mm. Subsequently, the blank fell through a falling chute up to the opening of a one-way mold and after optical release was conveyed by means of an accelerated press ram with a speed of 4 m/sec into the one-way mold (diameter=20.6 mm) and compressed therein. After reaching the necessary molding pressure (550 MN/m$^2$), the opposite die (with a pressing force limitation) was withdrawn. Thereby, the completed compressed blank fell into a heated cooling distance (zone) where it was brought to room temperature with an average cooling speed of 25° C./sec. The molding and ejecting process or the residence time in the one-way mold was 1.8 milliseconds. Separate measurements showed that the temperature drop between blank nucleus and blank surface before the one-way mold at the beginning of molding process was 100° C.

The completely pressed molded article had a diameter of 19.9 mm and a height of 59.7 mm. The density was 6.09 g/cm$^3$ which was 97.1 percent of the theoretical value.

Example 2

As the starting materials for the production of platelets (15×15×2 mm), there were used Al$_2$O$_3$ and TiC powders having the following properties.

| | | | |
|---|---|---|---|
| Al$_2$O$_3$ | Average particle size | 3 | μm |
| | BET-surface area | 15 | m$^2$/g |
| | Bulk density | 0.8 | g/cm$^3$ |
| TiC | Particle size | <1 | μm |
| | BET-surface area | 13 | m$^2$/g |
| | Bulk density | 0.6 | g/cm$^3$ |

After mixing the two components in the ratio 3:2 (60 wt.% Al$_2$O$_3$/40 wt.% TiC), the powder mixture was compressed in a square mold with a molding pressure of 200 MN/m$^2$ to square plates having the dimensions 16×16×3 mm. The density of the green blanks preliminarily pressed at room temperature was 2.2 g/cm$^3$—corresponding to 54 percent of theoretical.

The preliminarily pressed molded articles were heated in an inert gas atmosphere to 1950° C., hereby the dimensions of the molded article in the hot condition were reduced to 15.2×15.2×2.9 mm. Subsequently, the molded article was compressed in a manner analogous to Example 1.

The completely pressed plates had the following dimensions: 14.9×14.9×1.95 mm. The density was 3.9 g/cm$^3$ which was 96.8 percent of the theoretical value.

What is claimed is:

1. In a process for the production of a high temperature resistant, high density ceramic molded article from at least one component by the action of force on a blank at a temperature above 1300° C. and at high pressure in a cold mold, the improvement comprising heating the blank in a heating oven outside the mold to the necessary molding temperature and subsequently conveying the blank with a rapidly, movable pressing punch with a speed of 1 to 10 m/sec into the cold mold closed by a lower punch on the opposite side, compressing there and ejecting in the pressing direction, whereby the sum of the time of conveying the blank from the heating oven to the mold and the residence time in the mold is so regulated that the drop in temperature arising between the nucleus of the blank and the surface of the blank does not exceed 150° C. and the residence time in the mold is less than 3 msec.

2. A process according to claim 1 wherein the heated blank is cooled during the conveying and molding process around a maximum of 100° C. on the surface of the blank.

3. A process according to claim 2 wherein the molding temperature is below the melting point of the lowest melting component of the molded article.

4. A process according to claim 1 wherein the molding temperature is below the melting point of the lowest melting component of the molded article.

5. A process according to claim 4 wherein the molding temperature is about 100° C. below the melting point of the lowest melting component.

6. A process according to claim 3 wherein the molding temperature is about 100° C. below the melting point of the lowest melting component.

7. A process according to claim 6 wherein the ceramic article is made from zirconium dioxide, aluminum oxide, titanium carbide, silicon carbide, or mixtures thereof.

* * * * *